United States Patent
D'Alo et al.

(10) Patent No.: US 7,228,407 B2
(45) Date of Patent: Jun. 5, 2007

(54) ADAPTIVE MANAGEMENT METHOD AND SYSTEM WITH AUTOMATIC DEPENDENCY RESOLUTION

(75) Inventors: Salvadore D'Alo, Rome (IT); Alessandro Donatelli, Rome (IT); Giovanni Lanfranchi, Placenza (IT); Claudio Marinelli, Latina (IT)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 10/524,566

(22) PCT Filed: Aug. 13, 2003

(86) PCT No.: PCT/EP03/10081

§ 371 (c)(1),
(2), (4) Date: Feb. 11, 2005

(87) PCT Pub. No.: WO2004/017201

PCT Pub. Date: Feb. 26, 2004

(65) Prior Publication Data

US 2005/0289090 A1    Dec. 29, 2005

(30) Foreign Application Priority Data

Aug. 13, 2002   (EP)   .................... 02368088

(51) Int. Cl.
*G06F 15/177* (2006.01)
(52) U.S. Cl. .............. 713/1; 706/47; 707/102; 709/220; 717/176
(58) Field of Classification Search .......... 713/1, 713/100; 706/14, 47
See application file for complete search history.

(56) References Cited

U.S. PATENT DOCUMENTS

| | | | | |
|---|---|---|---|---|
| 4,888,771 | A | * | 12/1989 | Benignus et al. ............. 714/26 |
| 5,889,953 | A | | 3/1999 | Thebaut et al. |
| 6,039,688 | A | * | 3/2000 | Douglas et al. ............. 600/300 |

(Continued)

OTHER PUBLICATIONS

J.W. Wotoen; An N-tier Rule Based XML Architecture for a contract Management System, XP002312565, URL:www.shoulderscorp.com/success/ContractManagement4.pdf>.

(Continued)

*Primary Examiner*—Thuan Du
(74) *Attorney, Agent, or Firm*—Stephen R. Tkacs; Stephen J. Walder, Jr.; Jeffrey S. LaBaw (57) ABSTRACT

A resource management method (300) and a corresponding system are proposed. In the solution of the invention, an authority publishes (324) multiple rules, each one defining a desired target configuration for a category of subjects (without any information about their dependencies). Each subject retrieves (320–322, 326) the rules corresponding to its category in a random order. The rules are then applied (427–439) on the subject according to a trial-and-fail approach. Particularly, the application of any failed rule is continually repeated (427–448), until all the rules are successfully applied (463) or a deadlock condition is detected (451). In this way, any dependency is automatically resolved on the subject at run time. Moreover, as soon as all the rules have been successfully applied the compliance of the subject to the rules is verified (455–457) again; should the subject be not compliant to one or more rules any longer, an infinite loop condition is detected (466).

20 Claims, 8 Drawing Sheets

U.S. PATENT DOCUMENTS

| | | | |
|---|---|---|---|
| 6,167,445 | A | 12/2000 | Gai et al. |
| 6,615,218 | B2 | 9/2003 | Mandal et al. |
| 6,618,715 | B1 * | 9/2003 | Johnson et al. ............... 706/47 |
| 6,915,338 | B1 | 7/2005 | Hunt et al. |
| 6,950,865 | B1 * | 9/2005 | Depaolantonio ............ 709/223 |
| 2002/0095454 | A1 | 7/2002 | Reed et al. |
| 2003/0115179 | A1 | 6/2003 | Prabakaran et al. |
| 2004/0049500 | A1 | 3/2004 | Donatelli et al. |
| 2004/0103173 | A1 | 5/2004 | Donatelli et al. |
| 2004/0111497 | A1 | 6/2004 | Donatelli et al. |

OTHER PUBLICATIONS

"Success stories", Internet Document, Feb. 2, 2002, XP002312566, URL:web.archive.org/web/20020202035939/http://www.shoulderscorp.com/success> Cited to establish a date of publication of the main document.

"Internet Archive Wayback Machine", Internet Document, XP002312567 URL:web.archive.org/web/*/http://www.shoulderscorp.com/success/>.

Virginia E. Barker; et al., "Expert Systems For Configuration at Digital: XCON and Beyond", Communications of the Association For Computing Machinery, New York, vol. 32, No. 3, Mar. 1, 1989, pp. 298-318.

"SENDMAIL (8) FreeBSD System manager's manual SENDMAIL (8)". Internet Document—FreeBSD Hypertext Man Pages, 'Online', Aug. 2, 1998, URL:www.freebsd.org/cgi/man.cgi?query=sendmail&apropos=0&sektion=0&manpath=FreeBSD+4.0-RE;EASE&format=html>.

Caspar Ryan; et al., "MobJeX: A Declaratively configurable java Based Framework for Resource Aware Object Mobility", 'Online', URL:www.cs.rmit.edu.au/eCDS/publications/DOAposterPaper.pdf>.

Timo Soininen and Ilkka Niemela: "Developing a Declarative Rule Language for Applications in Product Configuration", 'Online', URL:www.springerlink.com/media/87EXYKWHVN5J46LX8UE3/Contributions/V/J/F/U/VJFU2GLVLCNUMOMF.pdf.>.

\* cited by examiner

ADAPTIVE MANAGEMENT METHOD AND SYSTEM WITH AUTOMATIC DEPENDENCY RESOLUTION

TECHNICAL FIELD

The present invention relates to the data processing field, and more specifically to a resource management method and a corresponding system.

BACKGROUND ART

Management of different types of resources (such as software components, applications or devices) is a critical issue in a data processing system with a distributed architecture. This problem is particular acute when the system includes a high number of logic and/or physic entities (referred to as subjects), each one directly controlling one or more resources; the problem is further exacerbated if the subjects have a high level of complexity or are dispersed across a large number of installations.

The management environments known in that art are based on an enforcement model (also known as manager/workers model). In this model, the process is entirely controlled by an authority residing at a central site of the system. The authority defines a desired configuration of every subject. For this purpose, the authority accesses a central repository storing the (alleged) current configuration of each subject, and determines the management actions required to bring the subject to the desired configuration starting from the current configuration. The management actions are then enforced remotely by the authority on the subject (which is totally passive).

A drawback of the management environments known in the art is the lack of any kind of cooperation between the authority and the subjects. This lack of cooperation may bring about inconsistencies when the subjects are upgraded out of the control of the authority. Moreover, in the solutions currently employed the management of subjects that are temporarily unavailable or off-line is quit difficult to implement. The known management environments require the authority to maintain information about the location of all the subjects; at the same time, the authority must handle the communication with every subject directly.

An additional problem arises when a specific state of one or more resources is a pre-requisite to the execution of some management actions. A typical example is that of a patch for a software product; in this case, the installation of the patch requires that the software product be already available on the subject. More complex dependencies are experienced in large systems with several correlated tiers.

As a consequence, the authority must explicitly define a workflow that drives the enforcement of the management actions on each subject in the correct sequence.

The authority must also handle any conditioning among the management actions directly. In any case, some conflicts cannot be identified a priori. Conversely, those conflicts arise if particular (and often unforeseeable) conditions occur; therefore, they can be detected only at run time when the management actions are enforced (assuming that the subjects report the result of the enforcement to the authority).

This problem is particular acute in high dynamic environments, wherein complex dependencies are defined among the different resources.

Moreover, the above-mentioned drawbacks strongly increase the difficulty of correctly defining any solution to be deployed in the system.

SUMMARY OF THE INVENTION

It is an object of the present invention to provide a management method that implements a self-adaptive model.

Particularly, it is an object of the present invention to resolve any dependency among the management actions automatically.

It is another object of the present invention to ensure a correct sequencing of the management actions on each subject, without the need of defining a corresponding workflow explicitly.

It is yet another object of the present invention to handle any conditioning in the management actions automatically.

Moreover, it is an object of the present invention to simplify the definition of any solution to be deployed in the system.

The accomplishment of these and other related objects is achieved, in a data processing system including a plurality of subject entities and at least one authority entity, by an autonomic management method for self-configuring the subject entities, each subject entity belonging to at least one of a plurality of categories, wherein the method includes the steps of: the at least one authority entity publishing a plurality of rules each one defining a target state for a category, the target state of at least one rule being a prerequisite for the target state of at least one further rule, each subject entity retrieving the rules for the corresponding at least one category, applying each retrieved rule to configure the subject entity according to the target state, the application of the retrieved rule failing when at least one corresponding prerequisite is not available on the subject entity, and repeating the application of each failed rule to configure the subject entity according to the target state specified in the failed rule when all the corresponding prerequisites are available.

The present invention also provides a computer program for performing the method and a corresponding computer program running on each subject entity; program products storing those programs are also encompassed.

Moreover, the present invention provides a system implementing the method and a computer of the subject entity for use in the system.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1A:
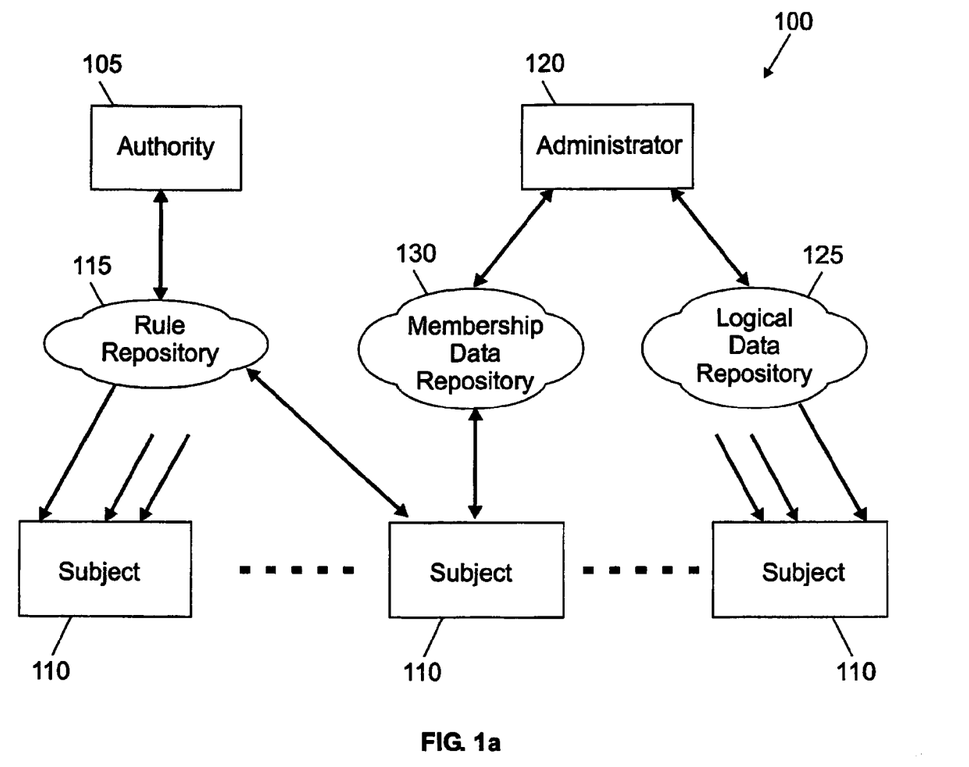
FIG. 1a is a schematic block diagram of a data processing system in which the management method of the invention is applicable.

With reference in particular to FIG. 1a, a data processing system 100 with a distributed architecture (typically INTERNET-based) is shown. The system 100 implements an environment for managing several kinds of resources, such as products in a software distribution application, in a monitoring application, and the like.

A computer 105 operates as an authority, which is responsible to define a desired configuration of the system 100. Multiple computers 110 operate as heterogeneous subjects, which directly control one or more instances of different resources under management. Each subject 110 is defined by one or more characteristics of logic and/or physic entities (such as a desktop, a Personal Digital Assistant (PDA), a SIM card of a mobile telephone, every user of a workstation, and the like).

The authority 105 and the subjects 110 communicate in an associative way (at the information level) through a shared repository 115. The repository 115 stores a set of rules (or laws). Each rule specifies a desired configuration for a category of subjects, defined according to their logic and/or physic characteristics; particularly, the desired configuration is characterized by a target state of one or more resources (which instances are controlled by the subjects belonging to the category associated with the rule). Moreover, the rule can include formal parameters (or arguments), which are used to pass a value or a reference dynamically when the rule is applied on the corresponding subjects; for example, the formal parameters define correlations with different categories.

The rules are established regardless of any dependencies among the target states of the respective resources (which dependencies are resolved at run time, as described in detail in the following). In other words, each rule does not include any information about the target states of one or more resources that are pre-requisite for the target state of the respective resource. For example, when the installation of a software product is required for installing a corresponding patch (on the subjects belonging to a specific category), two rules are issued simply specifying that the software product and the patch, respectively, must be installed for that category.

A computer 120 operates as an administrator, which is responsible to define the categories of the subjects 110 dynamically at a logic level. The information is available in a shared repository 125; the relevant information stored in the logic data repository 125 is transmitted to every subject 110.

The subjects 110 communicate through an additional shared repository 130 (defining a virtual word implemented in the system 100); for each subject 110, the repository 130 stores membership information indicating the category of the subject and its compliance to the corresponding rules. The membership data repository 130 is further accessed by the administrator 120.

The above-described repositories implement a peer-to-peer communication model, which totally decouples the different entities of the system 100 (authority 105, subjects 110 and administrator 120). Particularly, a destination decoupling results from the fact that the entities do not need to refer to each other explicitly (thereby providing a fully anonymous communication scheme); in other words, a mutual knowledge of the location of the different entities is not necessary. Moreover, time decoupling results from the fact that the entities do not need to be available at the same time.

Figure 1B:
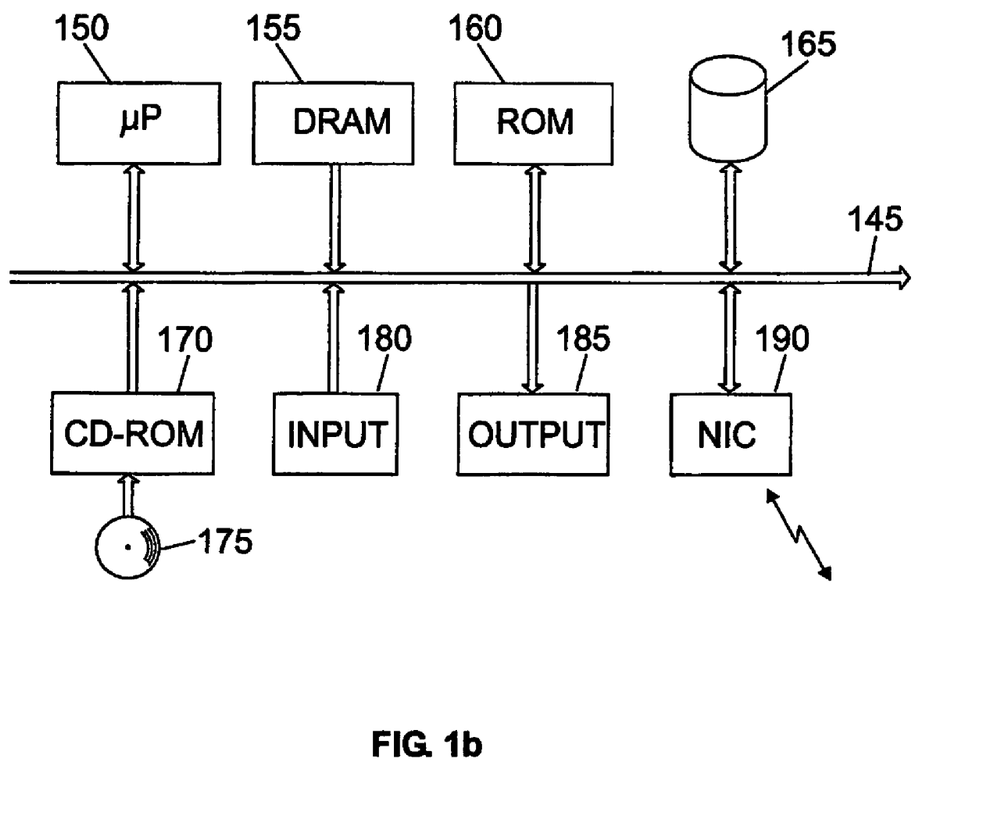
FIG. 1b shows the functional blocks of a generic computer of the system.

A shown in FIG. 1b, a generic computer of the system (authority, subject, or administrator) is formed by several units that are connected in parallel to a communication bus 145. In detail, one or more microprocessors (µP) 150 control operation of the computer, a DRAM 155 is directly used as a working memory by the microprocessor(s) 150, and a ROM 160 stores basic code for a bootstrap of the computer. Several peripheral units are further connected to the bus 145 (by means of respective interfaces). Particularly, a mass memory consists of a magnetic hard-disk 165 and a driver 170 for reading CD-ROMs 175. Moreover, the computer includes input devices 180 (for example, a keyboard and a mouse), and output devices 185 (for example, a monitor and a printer). A network Interface Card (NIC) 190 is used to connect the computer in the system.

However, the concepts of the present invention are also applicable when the management environment is implemented in an equivalent data processing system (for example, based on a LAN), or when different resources and entities are envisaged. Similar considerations apply if the computers have another architecture or include equivalent units. Alternatively, two or more authorities and/or administrators are provided, the authority and the administrator consist of a single entity, or different repositories are used for publishing the information about the categories of the subjects and the information about the compliance of the subjects to the corresponding rules, respectively.

Figure 2:
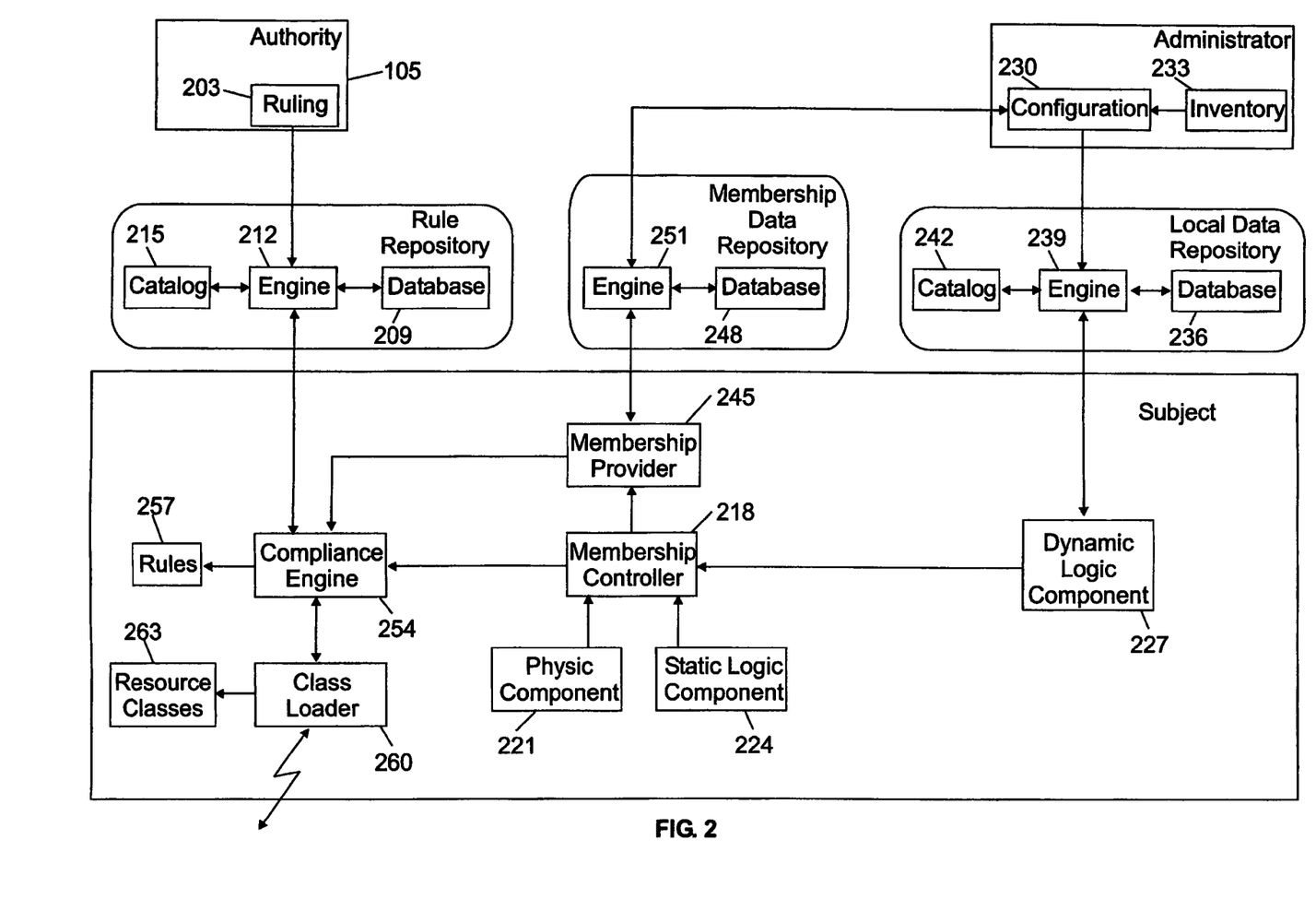
FIG. 2 depicts the main software components used for implementing the management method.

Considering now FIG. 2, the main software components used in the management environment described above are illustrated. The information (programs and data) is typically stored on the hard-disks of the computers and loaded (at least partially) into their working memories when the programs are running, together with an operating system and other application programs (not shown in the figure). The programs are initially installed onto the hard-disks from CD-ROMs.

Particularly, the authority 105 includes a ruling module 203 that is used to define new rules (for example, implementing a solution to be deployed in the system). Each new rule is validated for its semantic correctness; if the new rule is not in contrast to the other rules, the module 203 publishes the new rule into the corresponding repository 115.

The rule repository 115 is implemented as a Web application. In detail, a relational database 209 stores all the rules currently in force. An engine 212 controls the execution of different management operations on the database 209 (for example, insertion of new rules, deletion of pre-existing rules or extraction of selected rules). In addition, each subject 110 can register with the engine 212; for this purpose, the subject 110 submits an identifier (typically consisting of a Globally Unique Identifier, or GUID) and an indication of its category; the information about the registered subjects is stored in a catalog 215 controlled by the engine 212.

Each subject 110 includes a membership controller 218, which assigns the subject 110 to the respective category (according to its logic and/or physic characteristics). For this purpose, the membership controller 218 cooperates with one or more plug-in modules.

Particularly, a first module 221 assigns the subject 110 to a category defined according to its physic properties. For example, the physic category is specified by hardware characteristics (such as a hard-disk size, a CPU model, or a working memory capacity) and/or software characteristics (such as installed applications, files or folders). For this purpose, the module 221 leverages a hardware inventory scanner, a software inventory scanner and an application scanner (not shown in the figure).

A different module 224 statically assigns the subject 110 to a category defined according to its logic properties. For example, the static logic category specifies different groups of users (such as secretaries, managers, developers, system engineers) or different characteristics of physic entities (such as desktops, laptops, PDAs, mobile telephones); the static logic category of the subject 110 is derived from an identification code that is input during a log-in procedure or is hardwired.

Another module 227 dynamically assigns the subject 110 to a category defined according to further logic properties. For example, the dynamic logic category specifies a current function of the subject 110 in the system (such as server or agent in a monitoring application, depot in a software distribution application, and the like).

The dynamic logic categories of the different subjects 110 are set by a configuration module 230 running on the administrator 120. For this purpose, the configuration module 230 accesses an inventory 233 (for example, storing information about the organization of a company wherein the system is implemented). The information specifying the dynamic logic categories assigned to the subjects 110 is then published into the corresponding repository 125.

The logic data repository 125 (implemented as a Web application) includes a relational database 236 storing the category information; an engine 239 controls the database 236. Each subject 110 (identified by the corresponding GUID) can register with the engine 239; the information about the registered subjects 110 is stored in a catalog 242 controlled by the engine 239. The module 227 directly interfaces with the engine 239, in order to retrieve the information defining the dynamic logic category of the subject 110.

The membership controller 218 drives a membership provider 245. The membership provider 245 publishes information specifying the category of the subject (physic category, static logic category and/or dynamic logic category) into the corresponding repository 130. The membership data repository 130 (implemented as a Web application) includes a relational database 248 storing the membership information; an engine 251 controls the database 248. In addition, the engine 251 also interfaces with the configuration module 230 running on the administrator 120.

The membership controller 218 further supplies the information identifying the category of the subject 110 to a compliance engine 254. The compliance engine 254 retrieves the rules associated with the category of the subject 110 from the corresponding repository 115 (through the engine 212). The retrieved rules are stored into a log 257 and then applied on the subject 110; for each rule, the log 257 also stores a flag indicating whether the subject is compliant or not to the rule. The compliance engine 254 interfaces with a class loader 260, which is used to load the classes 263 of the required resources on the subject 110 (from one or more repositories, not shown in the figure). Each resource class 263 controls a state catalog, which specifies the current state of each resource under management. The resource class 263 further accesses a transition table; for each resource controlled by the subject 110 and for each pair current state/target state, the transition table indicates one or more management actions required for bringing the resource from the current state to the target state.

The compliance engine 254 also leverages the membership provider 245, in order to identify the subjects belonging to the category specified in any formal parameter (included in the rules to be applied on the subject 110). In addition, the engine 254 supplies information, indicative of the compliance of the subject 110 to the correspoding rules, to the membership provider 245. The information is published into the membership data repository 130 (under the control of the engine 251).

Similar considerations apply if a whole application (consisting of the programs on the different computers) and the corresponding data are structured in a different manner, if other modules or functions are provided, or if the programs are distributed on any other computer readable medium (such as one or more floppy-disks). However, the concepts of the present invention are also applicable when the new rules are not validated by the authority, or when the shared repositories are implemented with different technologies. Alternatively, the categories are based on other characteristics of the subjects, the physic and/or logic characteristics of the subjects are detected in a different manner, or the categories are defined in another way (for example, with a different number and/or type of components, down to a single one).

Figure 3:
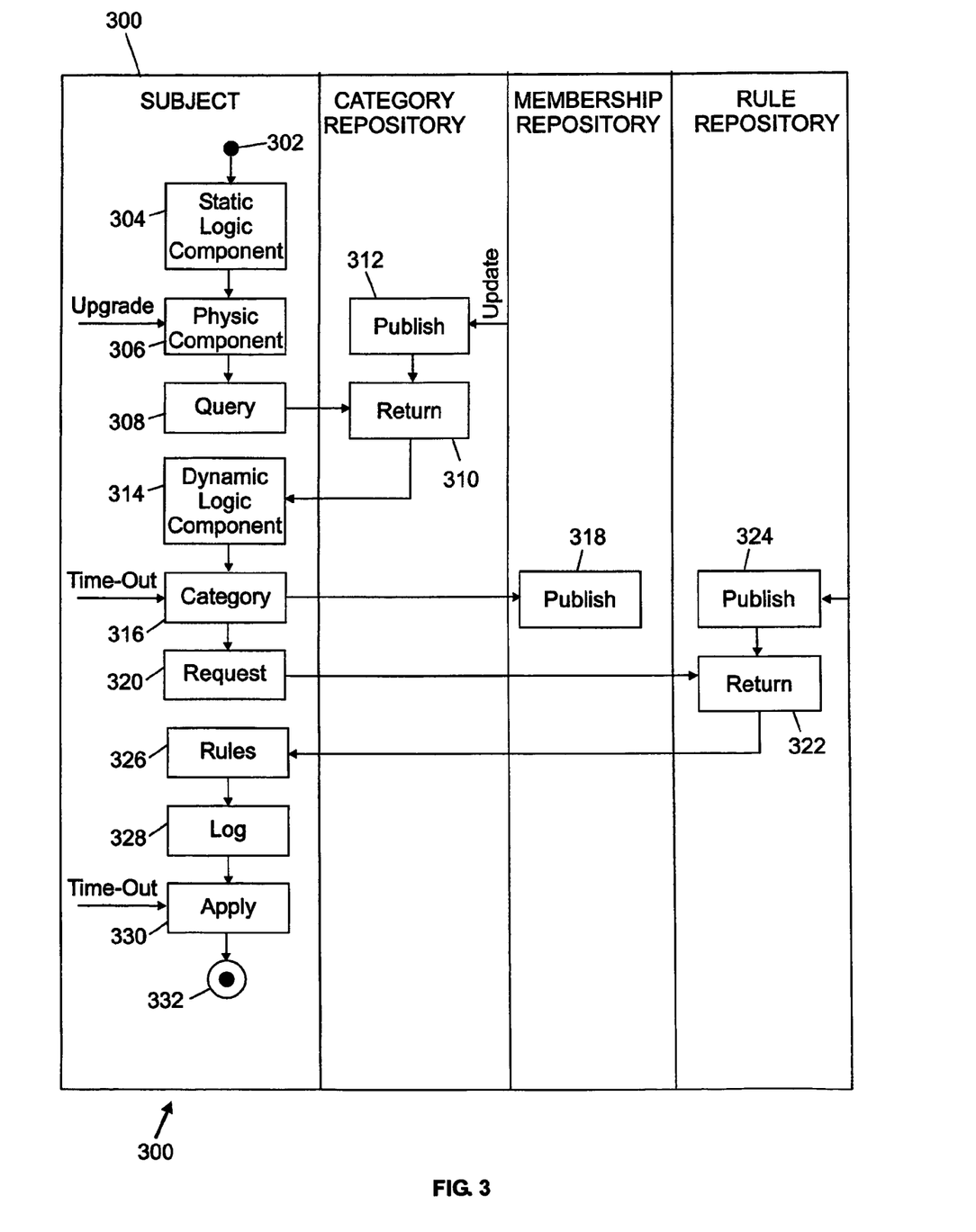
FIG. 3 is a diagram describing the flow of activities relating to the self-configuration of a subject in the system.

In the system described above, each subject self-adapts to the rules published by the authority according to a trial-and-fail approach. As shown in FIG. 3, a corresponding process 300 begins at the black start circle 302 (in the swim-lane of the subject). Descending into block 304, the subject derives its static logic category from the identification code that is input during the log-in procedure or is hardwired.

Hardware and software scans are then executed at block 306 (assuming that the rules for installing the corresponding modules have already been applied), in order to detect the physic category of the subject; the same activities are also performed in response to the notification of a software and/or hardware upgrade carried out on the subject.

The process continues to block 308, wherein the subject queries the logic data repository in order to identify its dynamic logic category. In response thereto, the engine of the logic data repository at block 310 retrieves the corresponding information from its database; the category information is then returned to the subject. The block 310 is also reached from block 312 (in the swim-lane of the logic data repository), whenever updated information is published in the logic data repository for the subject (under the control of the administrator); in this way, the subject is promptly notified of any change in its dynamic logic category (assuming that the subject has previously registered with the logic data repository). Returning to the swim-lane of the subject, the category information is received from the corresponding repository at block 314.

Considering now block 316, information identifying the category of the subject (static logic category, physic category and dynamic logic category) is supplied to the membership data repository. The same activity is also performed whenever a predetermined time-out expires (for example, every hour). If the category has changed since a last verification, the information about the new category of the subject is published in the database of the membership data repository at block 318.

Referring back to the swim-lane of the subject, the rules corresponding to the category of the subject are requested to the rule repository at block 320. In response thereto, the engine of the rule repository at block 322 retrieves the relevant rules from its database; the rules are then returned to the subject, so as to implement a pull mode of operation. The block 322 is also reached from block 324 (in the swim-lane of the rule repository), whenever new rules are published for the category of the subject (under the control of the authority); in this way, the subject is promptly notified of any new rule applying to its category (assuming that the subject has previously registered with the rule repository), so as to implement a reactive mode of operation.

The process proceeds to block 326 in the swim-lane of the subject, wherein the rules corresponding to the category of the subject are received from the respective repository. The received rules are then logged on the subject at block 328. Considering now block 330, all the rules are applied on the subject (as described in detail in the following); the same activity is also performed whenever a predetermined time-out expires (for example, every day). The process then ends at the concentric white/black stop circles 332. In this way, the new rules are applied on the subject as soon as they are received; in addition, all the rules are periodically re-applied, so as to implement a healing mode of operation.

Figure 4A:
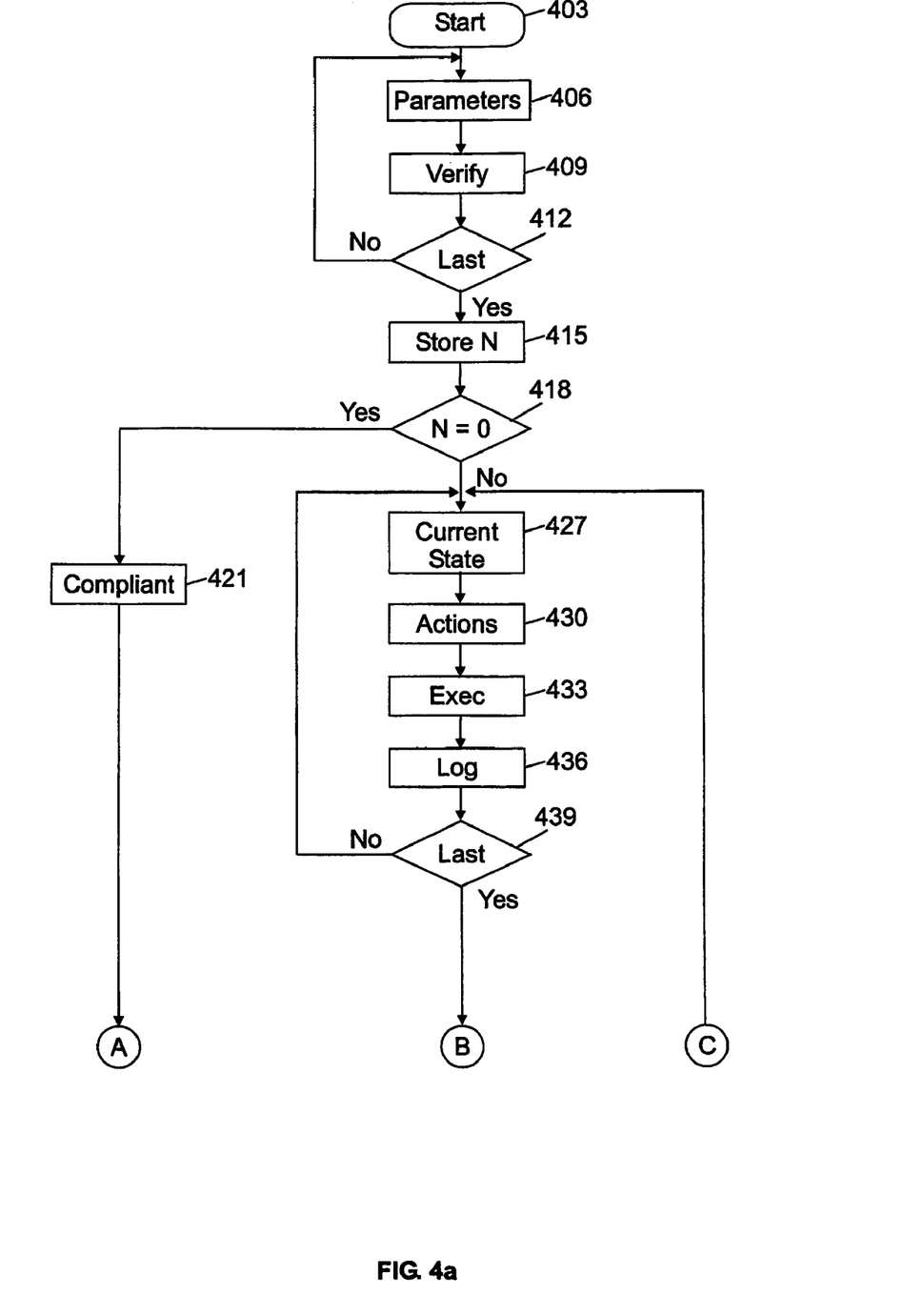
FIGS. 4a–4b show a flow chart specifying the actions executed on the subject.
Figure 4B:
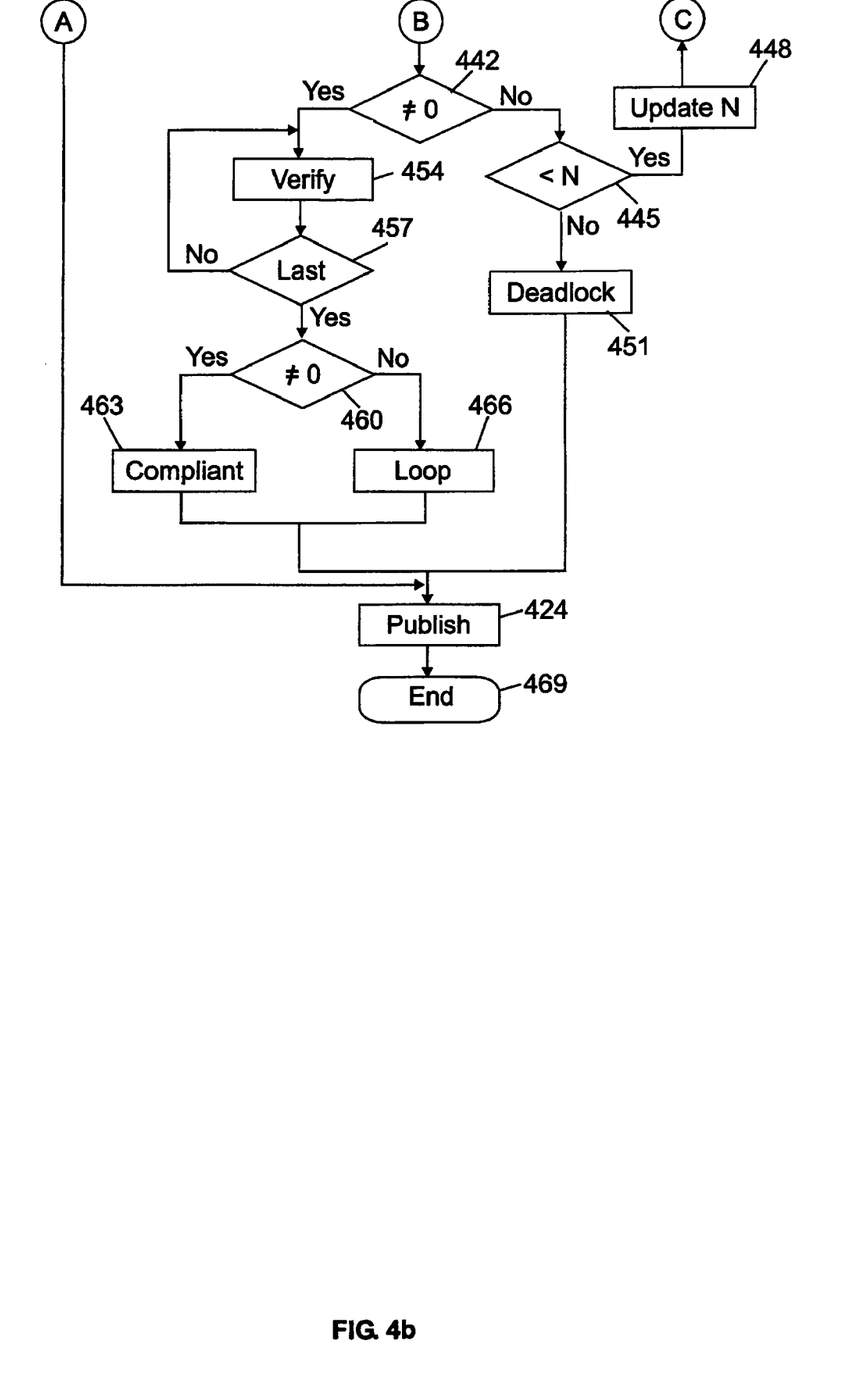

Moving now to FIGS. 4a–4b, the application of the rules on the subject implements a process that expands the block 330 described above. The process is executed whenever new rules for the subjects are retrieved from the respective repository (in response either to their publication or to the time-out expiration). Should the rules be received when the process is already in progress, that process is aborted and a new process is started.

The activity flow of the process starts at block 403, and then passes to block 406. For each rule (starting from the first one), any formal parameter is resolved; for this purpose, the formal parameter is replaced by the subject(s) belonging to the corresponding category (retrieved from the membership data repository). Referring now to block 409, the subject verifies whether the resource specified in the rule is already in the desired target state; if so, the compliance flag associated with the rule is set. At the same time, in the event of any inconsistency of the resource, the corresponding entry of the state catalog is updated accordingly; this feature is used by the subject to self-repair its configuration (restoring the correct target state of any resource). For example, let us assume that a component of an application installed on the subject (such as a file) has been removed by mistake or during installation of another application. In this case, the verification of the rule used to install the application detects the inconstancy and sets the state of the application accordingly; as a consequence, when the rule is re-applied, the actions required to restore the missing file of the application will be performed automatically. Considering now block 412, the subject verifies whether the last rule has been processed. If not, the flow of activity returns to block 406 in order to execute the operations described above on a next rule.

As soon as all the rules have been processed, the method descends into block 415; the number of pending rules to which the subject is not compliant (denoted as N) is stored on the subject. A test is then made at block 418 to verify whether the number of pending rules N is zero. Is so, the process passes to block 421, wherein a variable specifying the state of the subject is set to a value indicating its compliance to all the rules. The flow of activity then continues to block 424 (described in the following).

Returning to block 418, if the number of pending rules N is greater than zero the process enters an inner loop. For each pending rule (starting from the first one), the loop starts at block 427 wherein the current state of the corresponding resource is detected. Proceeding to block 430, a list of the actions needed to bring the resource to the target state (specified in the pending rule) from the current state is extracted from the transition table. The process continues to block 433, wherein the actions are executed on the subject. Considering now block 436, the entry of the state catalogue for the resource is updated accordingly. Moreover, if the application of the rule has been successful (bringing the resource to the desired target state) the correspoding compliance flag is set. The subject then verifies at block 439 whether the last pending rule has been processed. If not, the process returns to block 427 in order to execute the operations described above on a next pending rule.

As soon as all the pending rules have been processed, the flow of activity descends into block 442; a test is made to determine whether the number of rules still pending is zero. Is not, the subject verifies at block 445 whether the number of rules currently pending is lower than N (i.e., whether this number is decreased). If the result of the test is positive, the method continues to block 448 wherein the number of pending rules N is updated accordingly. The flow of activity then returns to block 427, in order to repeat the inner loop 427–439.

Conversely, if the subject at block 445 determines that the number of pending rules N has not decreased the process descends into block 451. In this condition, a deadlock is detected, since some pending rules are prevented from successfully bringing the corresponding resources to their target states; in response thereto, the state variable is set accordingly to a value indicative of the deadlock condition. The process then continues to block 424.

For example, let us consider a rule specifying that a corresponding resource must be installed on the subjects belonging to a specific category. The installation of the resource requires the fulfillment of some conditions (such as a minimum memory space available on the hard-disk). If those conditions are not met on a generic subject of the category, the installation of the resource fails and the rule then hangs.

Referring back to block 442, if the number of pending rules N is zero the flow of activity descends into block 454. For each rule (starting from the first one), the subject verifies again whether the resource specified in the rule is still in the desired target state; if not, the compliance flag associated with the rule is reset. Considering now block 412, if the last rule has been processed the flow of activity returns to block 406 in order to execute the operations described above on a next rule. As soon as all the rules have been verified again, the process continues to the test block 460.

If the subject determines that it is still compliant to all the rules, the state variable is set accordingly. Conversely, if the subject is not compliant to one or more rules any longer an infinite loop is detected, since the application of some rules impairs the target state reached by the resources of other rules; the state variable is set accordingly to a value indicative of the loop condition. In both cases, the process then continues to block 424.

For example, let us consider a rule specifying that a resource must be installed on the subjects of a specific category; a further rule specifies that the same resource must be removed in the whole system. If the two rules are applied in that order, the resource is installed on the subject by the first rule; the next application of the second rule removes the resource, so that the subject will be no longer compliant to the first rule. Likewise, if the rules are applied in the reverse order, the resource is removed from the subject (if necessary) by the second rule; the next application of the first rule installs the resource, so that the subject will be no longer compliant to the second rule. In this condition, the application of the rules would repeat continually; in fact, the process never reaches a condition (terminating the loop) in which the subject is compliant to both the rules at the same time.

Considering now block 424, information about the compliance of the subject to the rules is transmitted to the membership data repository. Particularly, the state variable indicates whether the subject is compliant to all the rules (i.e., whether their application has been completed successfully or not); in the latest case, the state variable indicates whether the error is due to a deadlock or to an infinite loop. Moreover, for each rule the subject also provides information indicating whether the corresponding resource controlled by the subject is in the target state defined in the rule or not. The process then ends at the final block 469.

Similar considerations apply if an equivalent process is executed or if additional functions are provided. However, the concepts of the present invention are also applicable when the subjects operate in another way (for example, only in the pull mode or only in the reactive mode), or when the application of the rules on the subjects involves different operations. In alternative embodiments of the present invention, the rules do not support the definition of formal parameters, or the membership data repository is cleaned-up periodically; moreover, the administrator can enforce correction actions on non-compliant subjects, or the system can include one or more subjects operating as helpers for controlling the application of the rules on subjects that are not completely autonomous (for example, on mobile telephones).

Preferably, each rule is specified in the Extensible Markup Language (XML), which allows the creation of customized tags for any desired purpose. Each rule starts with a <LAW> tag and ends with a </LAW> tag. The rule includes a first part (WHO clause), which is enclosed between the tags <WHO> and </WHO>, and a second part (WHAT clause), which is enclosed between the tags <WHAT> and </WHAT>.

The WHO clause defines the category associated with the rule by means of one or more key/value pairs. Each component of the category is specified by a tag including the key GROUP, which defines the name of the category component; this tag is followed by the actual value of the category component enclosed between the tags <constant> and </constant>. The category components can be combined with standard logic operators (such as AND, OR, NOT, and the like).

The WHAT clause describes the resource to be configured by the rule. In detail, the resource is defined between the tags <RESOURCE_DEFINITION> and </RESOURCE_DEFINITION>; for example, the rule specifies a type of the resource (enclosed between the tags <RESOURCE_TYPE> and </RESOURCE_TYPE>), a repository from which corresponding software components can be downloaded (enclosed between the tags <RESOURCE_REPOSITORY> and </RESOURCE_REPOSITORY>), the name of its class (enclosed between the tags <RESOURCE_CLASS> and </RESOURCE_CLASS>), the identification of a specific instance of the resource (enclosed between the tags <INSTANCE_IDENTIFIER> and </INSTANCE_IDENTIFIER>), and the like. The target state of the resource under management is defined between the tags <DESIRED_STATE> and </DESIRED_STATE>. Any argument of the rule is enclosed between the tags <ARGUMENT> and </ARGUMENT>; the arguments can include one or more formal parameters, each one consisting of the name of an operational feature preceded by the symbol "$", which name is followed by a dot and an expression identifying a category.

For example, the following rule ("RULE1"):

```
<LAW>
    <WHO>
        <eq>
            <GROUP name="HD"/>
            <constant>MyHD</constant>
        </eq>
    </WHO>
    <WHAT>
        <RESOURCE_DEFINITION>
            <RESOURCE_TYPE>Program</RESOURCE_TYPE>
            <INSTANCE_IDENTIFER>MyProgram</INSTANCE_IDENTIFIER>
        </RESOURCE_DEFINITION>
        <DESIRED_STATE>Installed</DESIRED_STATE>
    </WHAT>
</LAW>
``` applies to all the subjects belonging to the category "HD=MyHD". The rule forces the subjects to have the instance "MyProgram" of the resource "Program" installed.

Likewise, the following further rule ("RULE2"):

```
<LAW>
    <WHO>
        <eq>
            <GROUP name="HD"/>
            <constant>MyHD</constant>
        </eq>
```

```
    </WHO>
    <WHAT>
        <RESOURCE_DEFINITION>
            <RESOURCE_TYPE>Patch</RESOURCE_TYPE>
            <INSTANCE_IDENTIFER>MyPatch</INSTANCE_IDENTIFIER>
        </RESOURCE_DEFINITION>
        <DESIRED_STATE>Installed</DESIRED_STATE>
    </WHAT>
</LAW>
``` forces the same subjects to have the instance "MyPatch" of the resource "Patch" installed; the rule RULE2 requires the installation of the resource "MyProgram" as a pre-requisite; however, that dependency is not specified in the rule RULE2 in any way.

Figure 5:
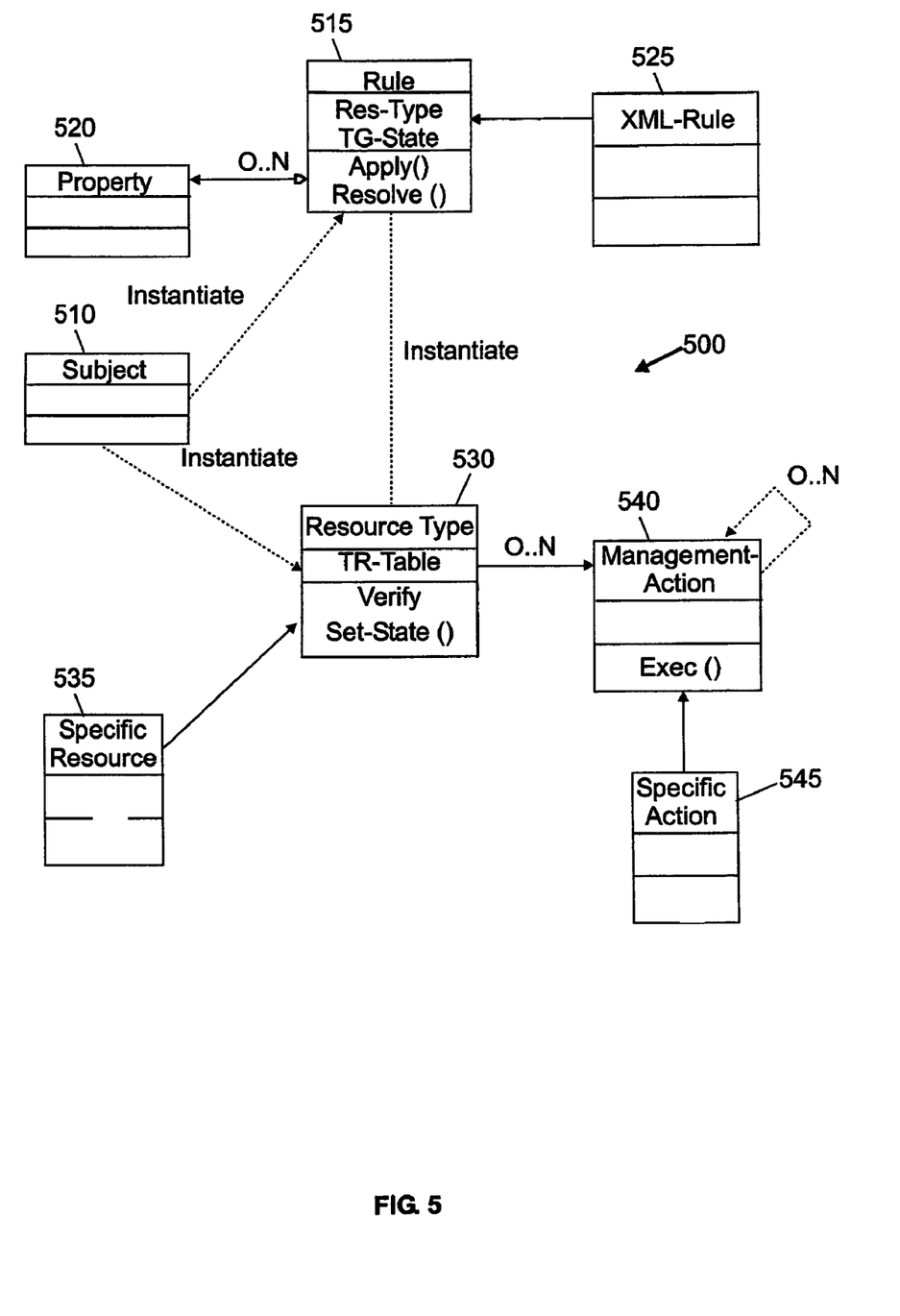
FIG. 5 depicts a class diagram implementing the management method.

The above-described management environment is preferably implemented with a software application that is written in an object-oriented language (such as Java). As shown in FIG. 5, a corresponding class diagram 500 includes a class "SUBJECT" 510 (representing a generic subject in the system). The class "SUBJECT" 510 instantiates objects of a class "RULE" 515, which represents a generic rule published by the authority. The class "RULE" 515 has a private attribute "RES_TYPE" (specifying the class name of the corresponding resource) and a private attribute "TG_STATE" (specifying the target state of the resource). Moreover, the class "RULE" 515 exposes a public method "APPLY" for implementing the rule on the subject; a private method "RESOLVE" is used to replace any formal parameter of the rule with the corresponding actual value.

The class "RULE" 515 has a collection consisting of any number of objects instantiating a class "PROPERTY" 520; each one of these objects includes additional information needed to apply the rule. A class "XML RULE" 525 extends the class "RULE" 515; the class "XML_RULE" 525 defines an actual implementation of the rule.

The class "RULE" 515 and the class "SUBJECT" 510 instantiate objects implementing an interface "RESOURCE_TYPE" 530, which represents a generic resource under management. The interface "RESOURCE_TYPE" 530 declares an abstract attribute "TR TABLE" for the corresponding transition table; moreover, the interface "RESOURCE_TYPE" 530 exposes a public method "VERIFY" (for validating the state of the resource) and a public method "SET_STATE" (for bringing the resource to the desired target state).

The interface "RESOURCE_TYPE" 530 is implemented by concrete classes 535 (generically denoted as "SPECIFIC_RESOURCE"), each one corresponding to a different type of resource (such as a file, a directory, a software package, a monitoring activity, and so on). Each class "SPECIFIC_RESOURCE" 535 defines the content of the transition table in the attribute "TR_TABLE".

The interface "RESOURCE_TYPE" 530 is further associated with any number of objects implementing an interface "MANAGEMENT_ACTION" 540 (which in turn is recursively associated with itself). The interface "MANAGEMENT_ACTION" 540 exposes a public method "EXEC" (for performing the required operations on the subject).

The interface "MANAGEMENT ACTION" 540 is implemented by concrete classes 545 (generically denoted as "SPECIFIC_ACTION"), each one corresponding to a different type of management action (such as add, remove or change the attributes of a file/directory, install, remove or restore a software package, trigger or stop a monitoring activity, and so on). Each class "SPECIFIC_ACTION" 545 actually defines the method "EXEC".

The application of a generic rule involves the instantiation of an object of the type "XML_RULE" (passing the corresponding XML definition as a parameter), followed by the calling of the method "APPLY". At first, the method "APPLY" calls the method "RESOLVE" (in order to substitute the actual values for any formal parameters of the rule). The method "APPLY" then instantiates an object of the type "SPECIFIC_RESOURCE" (whose name is stored in the attribute "RES_TYPE").

The verification of the compliance of the subject to the rule (at the beginning and at the end of the application of all the rules) is carried out calling the method "VERIFY". The actual application of the rule starts with the calling of the method "SET_STATE" on the object of the type "SPECIFIC_RESOURCE" (passing the target state stored in the attribute "TG_STATE" as a parameter). The method "SET STATE" determines the current state of the resource and then queries the transition table (stored in the attribute "TR_TABLE"), in order to determine the management actions required to bring the resource to the target state from its current state. One or more objects of the corresponding type "SPECIFIC_ACTION" are instantiated, and the method "EXEC" is called on every one of them.

However, the concepts of the present invention are also applicable when the rules are defined in a different way (for example, using a tuple space), or when the software application implementing the management environment is written in a different language (even a non-object-oriented one). Similar considerations apply if the rules have a different structure, if other classes, interfaces, attributes and/or methods are envisaged, and the like.

Figure 6:
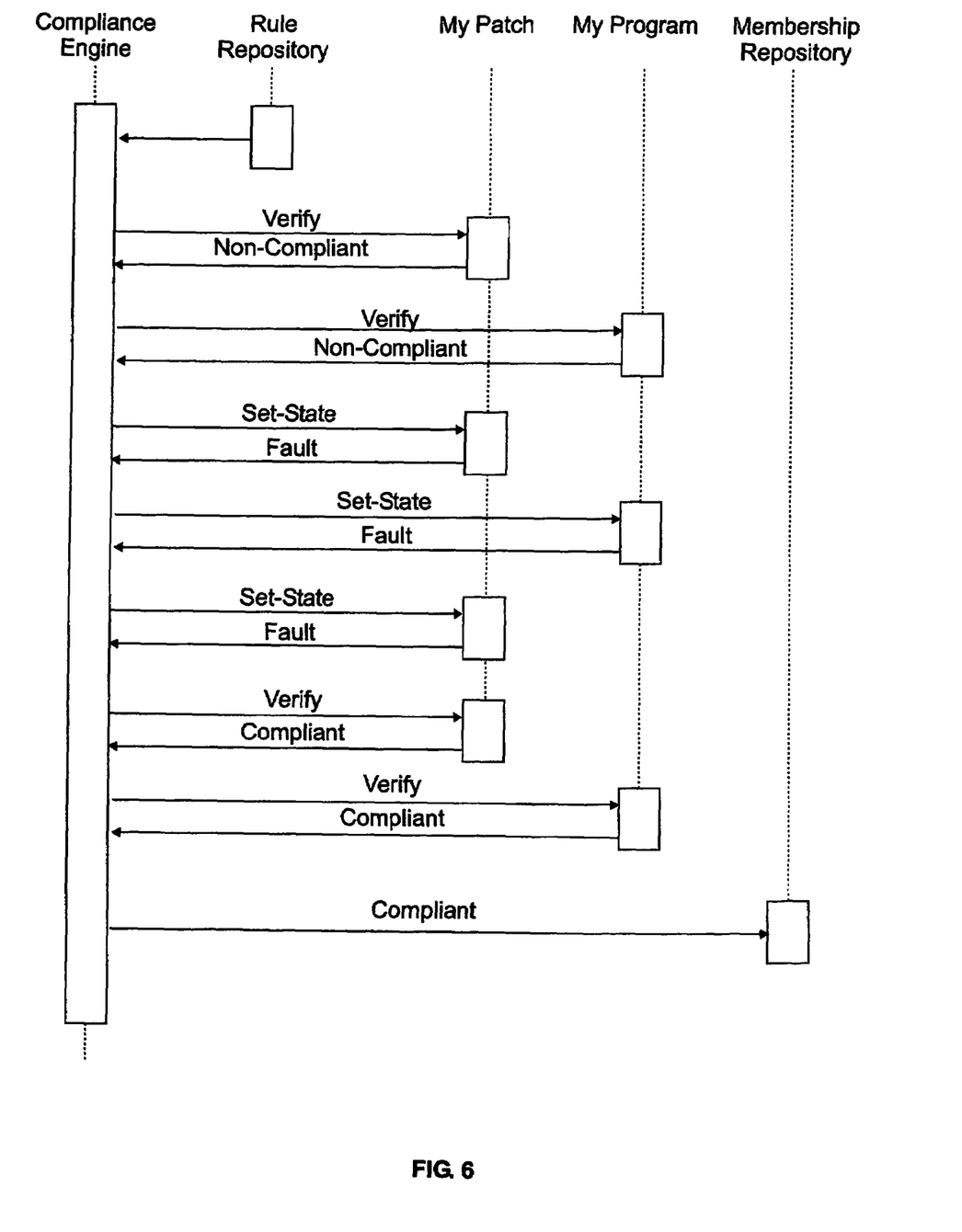
FIG. 6 is a sequence diagram exemplifying a specific management operation.

An example of a scenario involved by the application of the two rules described in the foregoing ("RULE1" and "RULE2") is illustrated in the sequence diagram of FIG. 6. A generic subject belonging to the category "MyHD" receives the rules "RULE1" and "RULE2" in a random order (for example, first the rule "RULE2" and then the rule "RULE1"). The compliance engine of the subject calls the method "VERIFY" on the resource "MyPatch" associated with the rule "RULE2"; assuming that the subject is not compliant to the "RULE2", a corresponding response is returned. The same operations are repeated for the resource "MyProgram" of the rule "RULE1".

The two pending rules "RULE2" and "RULE1" are then actually applied on the subject. For this purpose, the method "SET_STATE" is called on the resource "MyPatch"; since the resource "MyProgram" is not installed yet, the application of the rule "RULE2" fails. Conversely, when the method "SET STATE" is called on the resource "MyProgram", the application of the rule "RULE1" succeeds in bringing the resource "MyProgram" to its target state ("Intalled").

The same operations are repeated for the still pending rule "RULE2". However, when the method "SET_STATE" is called again on the resource "MyPatch", the application of the rule "RULE2" now succeeds (since the pre-requisite "MyProgram=Installed" is now available).

The compliance engine of the subject calls the method "VERIFY" again on the resource "MyPatch", and receives a response indicating that the subject is compliant to the rule "RULE2"; likewise, the compliance engine determines that the subject is compliant to the "RULE1" as well. The state variable indicating the compliance to all the rules ("RULE1" and "RULE2") is then transmitted to the membership repository.

Similar considerations apply to different scenarios, which relate to alternative applications or involve other rules and subjects. Moreover, in a different embodiment of the invention a description of minimal, specific dependencies for each rule is transmitted to the subject together with a corresponding package for the installation of the corresponding resource. Those dependencies are checked before the installation of the resource; in this way, any failing rules can be identified without the need to attempt their actual application.

The management environment described above implements an adaptive model, which can be compared to the behavior of the human society. In the human society a central authority (such as the parliament) enacts a series of laws for the citizens. Each law has a general character, and defines different provisions for corresponding categories of citizens. For example, a law establishes a series of tax rates, each one to be applied for a corresponding income range; moreover, a further law specifies that an income-tax return (specifying the details of the correspoding payment) must be filed with a competent authority.

The parliament publishes the laws using an official bulletin. Every citizen has the responsibility to remain up to date with the laws. In this way, the citizen can calculate the taxes to be paid applying the rate corresponding to his/her income, pay the resulting amount, and then file the income-tax return (filled in with the details of the payment). Should the citizen try filing the income-tax return before paying the taxes, that income-tax return would be refused by the competent authority. In this way, the parliament does not need to know any information about the citizens; at the same time, the correct sequence of the operations to be performed is controlled by every citizen directly.

The proposed solution clearly distinguishes from the enforcement model implemented by the resource management environments known in the art. Referring again to the parallel with the civil society, a central authority (such as a gas company) collects information about the conditions of every user; the central authority then issues a series of measures, each one individually tailored to the condition of the corresponding user. For example, the gas company detects the consumption of every user through a meter reading; only after that operation has been completed, the gas company can issue a corresponding invoice (wherein the amount to be paid is calculated according to the consumption). In this way, the gas company must collect all the required information about the customers; in addition, for each customer the gas company must verify the completion of that operation before issuing the corresponding invoice.

In other words, the proposed model provides an autonomic computing implementation of the management environment. The term autonomic comes from an analogy to the autonomic central nervous system in the human body, which adjusts to many situations automatically without any external help. Likewise, in the proposed management environment each subject is able to configure, tune and repair itself, as well as anticipate and solve performance problems automatically; as the same time, any dependencies can be resolved automatically by the subjects themselves.

More generally, the present invention proposes an autonomic management method for a data processing system; the system includes a plurality of subject entities and one or more authority entities. The method is used for self-configuring the subject entities; each subject entity belongs to one or more of a plurality of categories. The authority entity publishes a plurality of rules; each rule defines a target state for a category. The target state of one or more rules is a prerequisite for the target state of one or more further rules. Each subject entity retrieves the rules for the corresponding category. Each retrieved rule is then applied; the application of the retrieved rule fails when one or more corresponding prerequisite is not available on the subject entity or succeeds to configure the subject entity according to the target state specified in the retrieved rule otherwise. In the method of the invention, the application of each failed rule is repeated to configure the subject entity according to the target state specified in the failed rule when each corresponding prerequisite is available.

The solution of the invention provides a management method that implements a self-adaptive model. In this way, the subjects are no longer passive entities, but they actively participate in the management process.

The proposed method is able to resolve any dependencies among the management actions automatically.

Moreover, the devised solution removes the need to specify any information relating to a possible conditioning in the application of the rules.

As a result, the definition of any solution to be deployed in the system is strongly simplified.

It should be noted that this result can be achieved reusing components already available in known management environments (based on the enforcement model). Indeed, the method of the invention only changes the way these components are used, not their operation.

The preferred embodiment of the invention described above offers further advantages.

Particularly, a deadlock is detected when the number of pending rules does not decrease after each application.

In this way, any conflict in the definition of the rules can be readily identified (thereby preventing inconsistency conditions).

As a further enhancement, the number of pending rules is reset whenever further rules are retrieved on the subject.

The proposed feature completely de-couples the retrieving of the rules from their application.

A suggested choice for implementing the above-mentioned feature is to abort the process responsible of applying the rules.

This method is very simple, but at the same time effective.

A way to further improve the solution is to verify that the subject is still compliant to all the rules at the end of their application.

In this way, any infinite loop can be readily detected.

Advantageously, the solution according to the present invention is implemented with a computer program, which is provided as a corresponding product stored on a suitable medium. Moreover, it should be noted that the component of the program running on each subject is suitable to be implemented separately and put on the market even as a stand-alone product.

Alternatively, the program is pre-loaded onto the hard-disks, is sent to the computers through a network (typically the INTERNET), is broadcast, or more generally is provided in any other form directly loadable into the working memories of the computers. However, the method according to the present invention leads itself to be carried out even with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. In a data processing system including a plurality of subject entities and at least one authority entity, an autonomic management method for self-configuring the subject entities, each subject entity belonging to at least one of a plurality of categories, wherein the method includes the steps of:
   the at least one authority entity publishing a plurality of rules each one defining a target state for a category, the target state of at least one rule being a prerequisite for the target state of at least one further rule,
   each subject entity retrieving the rules for the corresponding at least one category,
   applying each retrieved rule to configure the subject entity according to the target state, the application of the retrieved rule failing when at least one corresponding prerequisite is not available on the subject entity, and
   repeating the application of each failed rule to configure the subject entity according to the target state specified in the failed rule when all the corresponding prerequisites are available.

2. The method according to claim 1, further including the step of:
   detecting a deadlock condition on the subject entity when the number of the corresponding failed rules does not decrease after each step of repeating the application.

3. The method according to claim 2, further including the steps of:
   the subject entity retrieving further rules for the corresponding at least one category, and
   resetting the number of the corresponding failed rules in response to the retrieving of the further rules.

4. The method according to claim 3, further including the step of:
   aborting the execution of a loop including the steps of applying the retrieved rules and repeating the application of the failed rules in response to the retrieving of the further rules.

5. The method according to claim 1, further including the steps of:
   the subject entity verifying the compliance to each retrieved rule in response to the successful application of all the retrieved rules, and
   detecting a loop condition when the subject entity is not compliant to at least one retrieved rule.

6. The method according to claim 1, wherein each subject entity is a computer that directly controls a resource.

7. The method of claim 1, wherein the at least one further rule does not include any information about the target states of the at least one rule that are a prerequisite for the target state of at least one further rule.

8. In a data processing system including a plurality of subject entities and at least one authority entity, an autonomic management system for self-configuring the subject entities, each subject entity belonging to at least one of a plurality of categories, wherein the at least one authority entity includes means for publishing a plurality of rules each one defining a target state for a category, the target state of at least one rule being a prerequisite for the target state of at least one further rule, and wherein each subject entity includes means for retrieving the rules for the corresponding at least one category, means for applying each retrieved rule to configure the subject entity according to the target state, the application of the retrieved rule failing when at least one corresponding prerequisite is not available on the subject entity, and means for repeating the application of each failed rule to configure the subject entity according to the target state specified in the failed rule when all the corresponding prerequisites are available.

9. The data processing system according to claim 8, wherein each subject entity includes means for detecting a deadlock condition on the subject entity when the number of the corresponding failed rules does not decrease after each step of repeating the application.

10. The data processing system according to claim 9, wherein each subject entity includes means for retrieving further rules for the corresponding at least one category and means for resetting the number of the corresponding failed rules in response to the retrieving of the further rules.

11. The data processing system according to claim 10, wherein each subject entity includes means for aborting the execution of a loop including the steps of applying the retrieved rules and repeating the application of the failed rules in response to the retrieving of the further rules.

12. The data processing system according to claim 8, wherein each subject entity includes means for verifying the compliance to each retrieved rule in response to the successful application of all the retrieved rules and means for detecting a loop condition when the subject entity is not compliant to at least one retrieved rule.

13. The data processing system according to claim 8, wherein each subject entity is a computer that directly controls a resource.

14. The data processing system of claim 8, wherein the at least one further rule does not include any information about the target states of the at least one rule that are a prerequisite for the target state of at least one further rule.

15. A computer program product comprising a computer useable medium having a computer readable program, wherein the computer readable program, when executed on a subject entity computing device, causes the subject entity computing device to:
   receive a plurality of rules published by at least one authority entity, each rule defining a target state for a category, the target state of at least one rule being a prerequisite for the target state of at least one further rule,
   apply each rule to configure the subject entity computing device according to the target state, the application of the rule failing when at least one corresponding prerequisite is not available on the subject entity computing device, and
   repeat the application of each failed rule to configure the subject entity computing device according to the target state specified in the failed rule when all the corresponding prerequisites are available.

16. The computer program product according to claim 15, wherein the computer readable program further causes the subject entity computing device to:

detect a deadlock condition on the subject entity when the number of the corresponding failed rules does not decrease after each step of repeating the application.

17. The computer program product according to claim 16, wherein the computer readable program further causes the subject entity computing device to:

receive further rules, and reset the number of the corresponding failed rules in response to the retrieving of the further rules.

18. The computer program product according to claim 17, wherein the computer readable program further causes the subject entity computing device to:

abort the execution of a loop including the steps of applying the retrieved rules and repeating the application of the failed rules in response to the retrieving of the further rules.

19. The computer program product according to claim 15, wherein the computer readable program further causes the subject entity computing device to:

verify the compliance to each retrieved rule in response to the successful application of all the retrieved rules, and detect a loop condition when the subject entity is not compliant to at least one retrieved rule.

20. The computer program product of claim 15, wherein the at least one further rule does not include any information about the target states of the at least one rule that are a prerequisite for the target state of at least one further rule.

* * * * *